United States Patent
Sato et al.

(10) Patent No.: US 7,237,343 B2
(45) Date of Patent: Jul. 3, 2007

(54) ORIENTATION DATA GENERATION METHOD, ORIENTATION SENSOR UNIT AND PORTABLE ELECTRONIC EQUIPMENT

(75) Inventors: Hideki Sato, Hamamatsu (JP); Yukio Wakui, Iwata (JP)

(73) Assignee: Yamaha Corporation, Shizuoka-Ken (JP)

( * ) Notice: Subject to any disclaimer, the term of this patent is extended or adjusted under 35 U.S.C. 154(b) by 3 days.

(21) Appl. No.: 11/200,051

(22) Filed: Aug. 10, 2005

(65) Prior Publication Data

US 2006/0032064 A1 Feb. 16, 2006

(30) Foreign Application Priority Data

Aug. 10, 2004 (JP) .............................. 2004-233442

(51) Int. Cl.
*G01C 17/38* (2006.01)
(52) U.S. Cl. .......................................... 33/356; 702/92
(58) Field of Classification Search .............. 33/355 R, 33/356, 357; 73/1.76; 701/224; 702/92, 702/93
See application file for complete search history.

(56) References Cited

U.S. PATENT DOCUMENTS

| | | | | |
|---|---|---|---|---|
| 5,701,259 | A * | 12/1997 | Dittrich ....................... | 702/92 |
| 6,539,639 | B2 * | 4/2003 | Smith ......................... | 33/356 |
| 6,651,003 | B2 * | 11/2003 | Woloszyk et al. .......... | 701/224 |
| 6,836,971 | B1 * | 1/2005 | Wan ............................. | 33/356 |
| 6,877,237 | B1 * | 4/2005 | Withanawasam ............ | 33/356 |
| 6,962,001 | B2 * | 11/2005 | Yano et al. ................ | 33/355 R |
| 7,119,533 | B2 * | 10/2006 | Tamura et al. .............. | 324/202 |
| 7,177,779 | B2 * | 2/2007 | Hikida et al. ............... | 702/150 |
| 2002/0103610 | A1 * | 8/2002 | Bachmann et al. ........... | 702/94 |
| 2006/0010699 | A1 * | 1/2006 | Tamura ..................... | 33/355 R |
| 2006/0156565 | A1 * | 7/2006 | Linjama ...................... | 33/356 |

FOREIGN PATENT DOCUMENTS

| | | |
|---|---|---|
| EP | 1 519 148 A1 | 3/2005 |
| JP | 2004-012416 | 1/2004 |
| WO | WO 2004003476 A1 * | 1/2004 |

\* cited by examiner

*Primary Examiner*—R. Alexander Smith
(74) *Attorney, Agent, or Firm*—Dickstein Shapiro LLP (57) ABSTRACT

Data are input from a geomagnetic sensor that detects magnetic fields in three axial directions, and magnetic field data are measured on the basis of the input data. The measured magnetic field data are sequentially stored, and a determination is made as to whether a plurality of the magnetic field data thus stored lie within a same plane in a three-dimensional orientation space. When it has been determined that the plurality of magnetic field data lie within the same plane in the three-dimensional orientation space, center coordinates of a circular arc where the stored magnetic field data lie are calculated, as provisional offset values, on the basis of the magnetic field data and in accordance with a predetermined algorithm. Magnetic field data measured after the calculation of the provisional offset values is corrected with the provisional offset values, and an arithmetic operation is performed for determining orientation data on the basis of the corrected magnetic field data.

19 Claims, 4 Drawing Sheets

ORIENTATION DATA GENERATION METHOD, ORIENTATION SENSOR UNIT AND PORTABLE ELECTRONIC EQUIPMENT

BACKGROUND OF THE INVENTION

The present invention relates to generally techniques for performing orientation (more specifically, azimuth) measuring calibration (offset correction) on the basis of orientation measuring data using a geomagnetic sensor. More particularly, the present invention relates to an improved orientation data generation method, orientation sensor unit and portable electronic equipment which, even when data obtained from a three-axis geomagnetic sensor are limited within a particular plane, can perform appropriate calibration to measure a correct orientation (or azimuth).

Portable terminals, such as portable phones, are known, which include a magnetic sensor for detecting geomagnetism and measure orientations on the basis of the geomagnetism detected by the magnetic sensor. The orientations measured in this manner are used, for example, to display a map. Recently, there have appeared portable terminals which are, for example, equipped with a GPS (Global Positioning System) function for detecting a position and has a function for displaying a map based on a current position in accordance with a current orientation (or azimuth) of the portable terminal.

However, in the portable terminals, there exists magnetism leaking from a speaker and microphone provided on the terminal, metal packages of magnetized electronic components, etc. Thus, the magnetic sensors provided in the portable terminals would detect a magnetic filed that comprises a combination of magnetic fields produced from the electronic components etc. within the terminal and the geomagnetism or earth's magnetism. For this reason, a calibration process has to be performed to compensate for error (offsets) caused due to the magnetic fields produced from the electronic components etc. within the terminal. Therefore, in order to perform the calibration process in the conventional portable terminals provided with a two-axis magnetic sensor, it has been conventional for the user to, for example, rotate or turn the portable terminal through 180 degrees so that the portable terminal can gather measured data from the magnetic sensor during the turning movement and estimate offsets on the basis of the measured data.

Among various conventionally-known techniques pertaining to calibration of a magnetic sensor provided in a portable terminal is one disclosed in Japanese Patent Application Laid-open Publication No. 2004-12416. According to the disclosed technique, the portable terminal is turned stepwise, a predetermined angle at a time, and offsets are estimated on the basis of data measured by the magnetic sensor at each of the angles, so that the calibration is performed without depending on the turning speed.

However, even with the technique disclosed in the No. 2004-12416 publication, the user must bother to turn the portable equipment, provided with the magnetic sensor, to perform the calibration process. Namely, although the disclosed technique can achieve some improvement over the traditional techniques, it necessitates the user to perform particular calibrating operation, so that the calibration in the disclosed technique is still as cumbersome to the user as in the traditional techniques. Particularly, where the magnetic sensor is a three-axis geomagnetic sensor, the user has to perform even more cumbersome operation because data of the three axes are required.

In order to perform accurate calibration in the case where the magnetic sensor is a three-axis geomagnetic sensor, it is preferable that data acquired via the geomagnetic sensor lie uniformly within a compass sphere (or orientation sphere); if the acquired data concentrate (i.e., are limited) within a particular plane, the calibration can not be performed in a satisfactory manner.

SUMMARY OF THE INVENTION

In view of the foregoing, it is an object of the present invention to provide an improved orientation data generation method, orientation sensor unit and portable electronic equipment which, even when data obtained from a three-axis geomagnetic sensor have been limited to a particular plane, can perform appropriate calibration to measure a correct orientation.

In order to accomplish the above-mentioned object, the present invention provides an improved orientation data generation method, which comprises a measurement step of inputting data from a geomagnetic sensor that detects magnetic fields in three axial directions and then measuring magnetic field data on the basis of the inputted data; a storage step of sequentially storing the magnetic field data measured by the measurement step; a determination step of determining whether or not a plurality of the magnetic field data stored by the storage step lie within a same plane in a three-dimensional orientation space; a provisional offset calculation step of, when the determination step has determined that the plurality of the magnetic field data, stored by the storage step, lie within the same plane in the three-dimensional orientation space, calculating, as provisional offset values, center coordinates of a circular arc where the stored magnetic field data lie, on the basis of the magnetic field data and in accordance with a predetermined algorithm; and an arithmetic operation step of correcting, with the provisional offset values, magnetic field data measured after calculation, by the provisional offset calculation step, of the provisional offset values and performing an arithmetic operation for determining orientation data on the basis of the corrected magnetic field data.

According to the present invention, when it has been determined that a plurality of the sequentially-stored magnetic field data lie within a same plane in the three-dimensional orientation space, center coordinates of a circular arc where the stored magnetic field data lie are calculated in accordance with the predetermined algorithm, and magnetic field data measured after the calculation of the provisional offset values are corrected (calibrated) with the provisional offset values. With such arrangements, the output data from the three-axis geomagnetic sensor can be calibrated, in a calibration process of the geomagnetic sensor, even when the output data concentrate within a particular plane. Further, even when no valid three-axis data has been obtained for the calibration, the calibration process can be performed appropriately using the provisional offset values. As a consequence, it is no longer necessary for the user to bother to move his or her portable electronic equipment, so that the present invention allows the calibration process to be performed without imposing any excessive burden on the user.

The present invention may be constructed and implemented not only as the method invention as discussed above but also as an apparatus invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
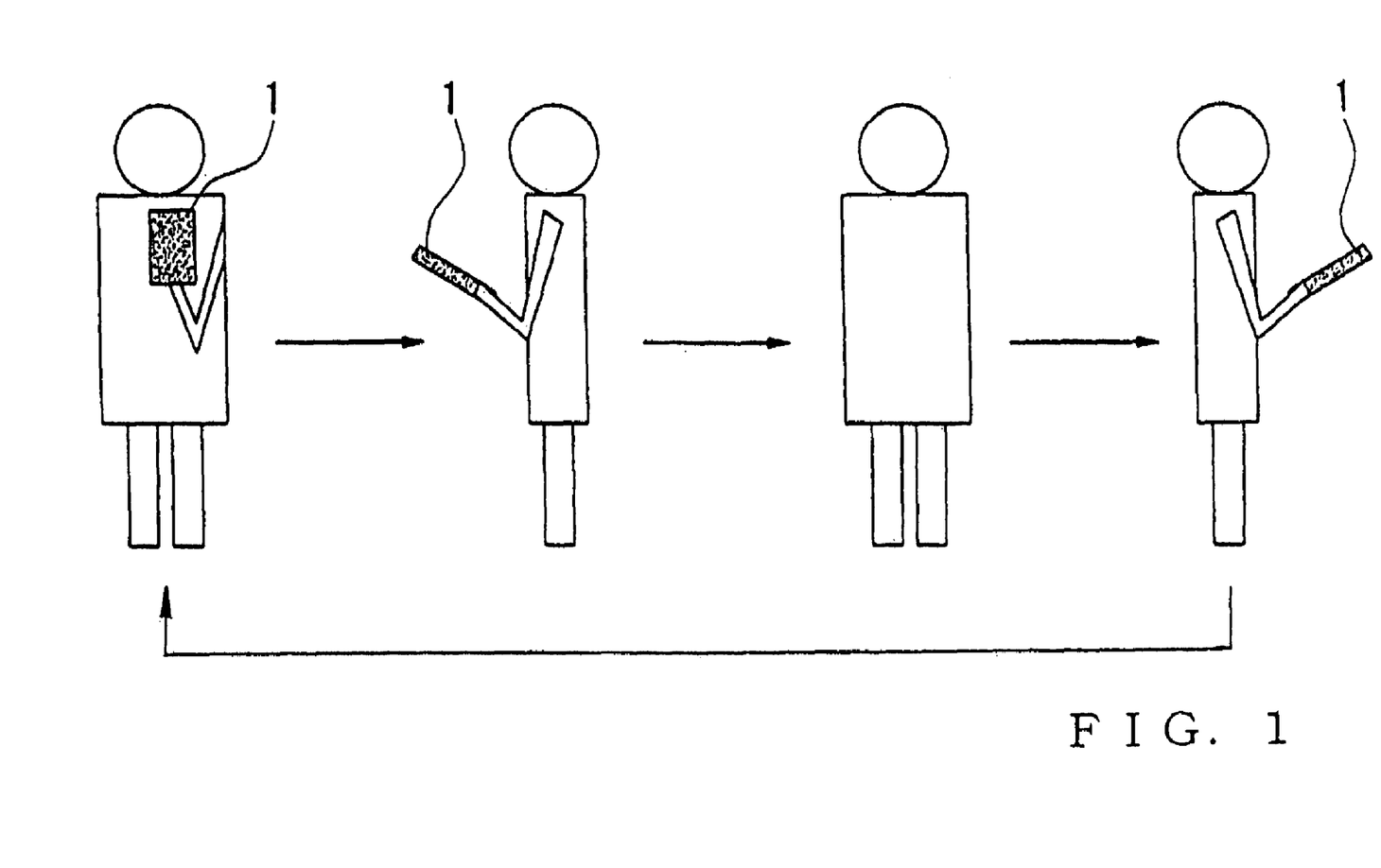
FIG. 1 is a view showing an example manner in which the present invention is carried out.

FIG. 1 shows a user of a portable terminal when the user has turned 360 degrees horizontally about a vertical axis holding in his or her hand the portable terminal that is provided with a three-axis geomagnetic sensor. In such a case, it has heretofore been impossible to perform calibration because the posture of the portable terminal itself does not change and thus outputs from the three-axis geomagnetic sensor concentrate (or are limited) within a particular plane. The present invention to be described below is intended to provide an improved method that permits appropriate calibration even in such a situation.

Figure 2:
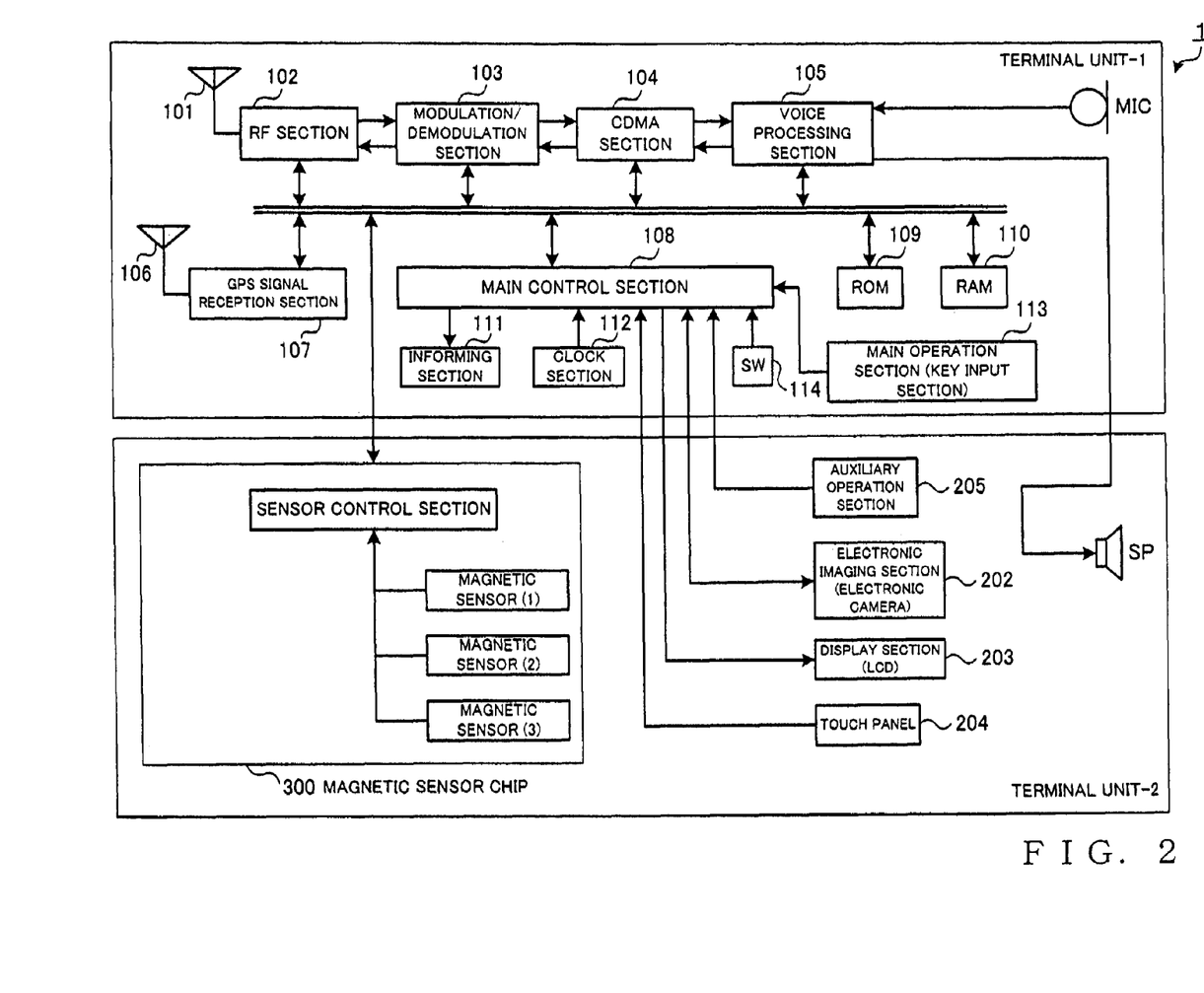
FIG. 2 is a block diagram showing an example general setup of portable electronic equipment (portable terminal) in accordance with an embodiment of the present invention.

FIG. 2 is a block diagram showing a general setup of portable electric equipment in accordance with an embodiment of the present invention, and it more particularly shows an example electrical setup of the portable electric equipment in the form of a portable communication terminal (hereinafter referred to as "portable terminal") that is based the CDMA (Code Division Multiple Access) communication scheme. In the following description and accompanying drawings, same or like elements are indicated by same reference characters.

As illustrated in FIG. 2, the portable terminal 1 of the present invention includes antennas 101, 106, an RF section 102, a modulation/demodulation section 103, a CDMA section 104, a voice processing section 105, a GPS signal reception section 107, a main control section 108, a ROM 109, and a RAM 110. The portable terminal 1 also includes an informing section 111, a clock section 112, a main operation section 113, an opening/closing switch 114, a magnetic sensor chip (magnetic sensor section) 300, an electronic imaging section 202, a display section 203, a touch panel 204, and an auxiliary operation section 205.

As seen in FIG. 2, the antenna 101 performs electromagnetic wave communication (transmission and reception) with a wireless (or radio) communication base station (not shown). The RF section 102, which includes a local oscillator etc., mixes a received signal, output from the antenna 101, with a local oscillation signal of a predetermined frequency to thereby convert the received signal into a received IF signal of a medium frequency and outputs the converted signal to the modulation/demodulation section 103. In transmission, the RF section 102 mixes a transmitting (i.e., to-be-transmitted) IF signal of a medium frequency with a local oscillation signal of a predetermined frequency to convert the transmitting IF signal into a transmitting signal of a transmitting frequency and outputs the converted transmitting signal to the antenna 101.

The modulation/demodulation section 103 performs a demodulation operation of the received signal, and a modulation operation of the transmitting signal. The modulation/demodulation 103, which includes a local oscillator etc., converts the received IF signal, output from the RF section 102, into a base band signal of a predetermined frequency, then converts the base band signal into a digital signal and then outputs the digital signal to the CDMA section 104. Also, the modulation/demodulation 103 converts a digital transmitting (to-be-transmitted) base band signal, output from the CDMA section 104, into an analog signal and into a transmitting IF signal of a predetermined frequency and outputs the thus-converted signal to the RF section 102.

The CDMA section 104 performs an encoding operation on each transmitting signal, and a decoding operation on each received signal. This CDMA section 104 decodes a base band signal output from the modulation/demodulation 103. Also, the CDMA section 104 encodes a transmitting signal and outputs the encoded base band signal to the modulation/demodulation 103.

The voice processing section 105 performs operations on voices uttered during a telephone call. During a telephone call, the voice processing section 105 converts each analog voice signal, output from a microphone (MIC), into a digital signal and outputs the converted digital signal to the CDMA section 104 as a transmitting signal. Also, the voice processing section 105 generates an analog drive signal for driving the speaker (SP), on the basis of a signal indicative of voice data decoded by the CDMA section 104 during a telephone call, and outputs the generated drive signal to the speaker (SP). The microphone (MIC) generates a voice signal based on a user-input voice and outputs the generated voice signal to the voice processing section 105. The speaker (SP) audibly generates or sounds a voice of the other party on the basis of a signal output from the voice processing section 105.

The GPS antenna 106 receives an electromagnetic wave transmitted from a GPS satellite (not shown) and then outputs, to the GPS signal reception section 107, a received signal based on the received electromagnetic wave. The GPS signal reception section 107 demodulates the received signal from the GPS antenna 106 and acquires, on the basis of the demodulated received signal, information, such as accurate time information and electromagnetic wave transmission time, of the GPS satellite. On the basis of the acquired information, the GPS signal reception section 107 calculates distances to three or more GPS satellites and position, in three-dimensional space (e.g., latitude, longitude and altitude), of the terminal using the principle of triangulation.

The main control section 108, which comprises a CPU (Central Processing Unit) or the like, controls various components within the portable terminal 1. The main control section 108 communicates, via a bus, control signals and data with the RF section 102, modulation/demodulation section 103, CDMA section 104, voice processing section

105, GPS signal reception section 107, the magnetic sensor chip 300, ROM 109 and RAM 110. The ROM 109 stores various programs to be executed by the main control section 108, initial characteristic values of a temperature sensor and inclination sensor measured at the time of a shipping inspection, and various other data. The RAM 110 temporarily stores data to be processed by the main control section 108, and various other data.

The informing section 111 includes, for example, a speaker, vibrator, light emitting diodes and/or the like and informs the user of an incoming call, e-mail and/or the like by sound, vibration, light and /or the like. The clock section 112 has a time keeping function to generate time information indicative of a date (year, month, day), day of the week, time of the day, etc. The main operation section 113 includes input keys operable by the user for entering characters (letters), conversion keys for converting Chinese characters, numerals, etc., cursor keys for operating a cursor, power ON/OFF key, talk key, redial key, etc., and it outputs, to the main control section 108, content of each operation by the user. Further, the opening/closing switch 114 detects a start of opening movement and an end of closing movement of the portable terminal in a case where the portable terminal 1 is of a collapsible type.

Figure 3:
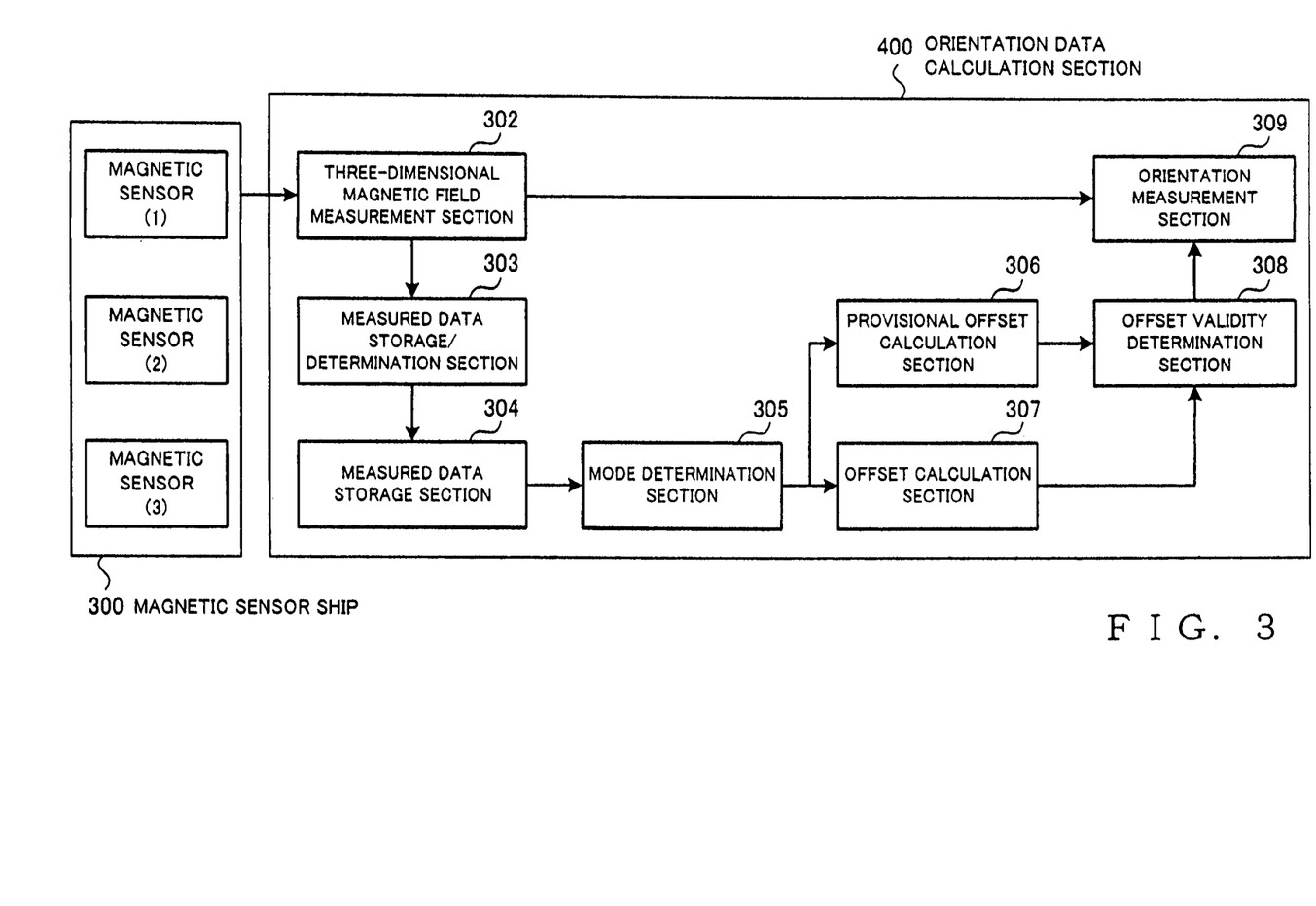
FIG. 3 is a block diagram showing an example general setup of an orientation sensor unit in accordance with an embodiment of the present invention.

The magnetic sensor chip 300 includes three magnetic sensors ("magnetic sensor (1)"–"magnetic sensor (3)", namely a "geomagnetic sensor", which will be collectively referred to as "three-axis magnetic sensor unit") for detecting respective axial magnetisms (magnetic fields) of mutually-intersecting X, Y and Z axes, and a sensor control section for processing the respective detection results of the magnetic sensors, as will be later detailed with reference to FIG. 3.

The electronic imaging section 202, which includes an imaging device, such as a CCD (Charge Coupled Device), converts an image of a subject, formed on an imaging surface of the imaging device via an optical lens, into an analog signal by means of the imaging device, and then outputs the converted digital signal to the main control section 108 after converting the analog signal into a digital signal. The display section 203 includes a liquid crystal display (LCD) etc., and it visually displays an image, characters and/or the like on the basis of displaying signals supplied from the main control section 108. The touch panel 204 is built in a surface of the liquid crystal display provided in the display section 203, and it outputs a signal, responsive to operation by the user, to the main control section 108. The auxiliary operation section 205 includes push switches operable to switch one display to another, etc.

Now, a detailed description will be given about functional blocks for measuring an orientation of the portable terminal, with reference to FIG. 3. As shown, the functional blocks for measuring an orientation includes the magnetic sensor chip (magnetic sensor section) 300 and an orientation data calculation section 400. The orientation data calculation section 400, which corresponds to the main control section 108 of FIG. 2, includes a three-dimensional magnetic field measurement section 302, a measured data storage/determination section 303, a measured data storage section 304, a mode determination section 305, a provisional offset calculation section 306, an offset calculation section 307, an offset validity determination section 308, an orientation measurement section 309, and an offset calculation trigger section (not shown).

The magnetic sensor section 300 includes the above-mentioned three-axis magnetic sensor unit (i.e., "magnetic sensor (1)"–"magnetic sensor (3)"), and sensor initialization sections (not shown) for initializing the corresponding magnetic sensors. Magnetized directions of the magnetic substances of "magnetic sensor (1)"–"magnetic sensor (3)" would be upset when a strong magnetic field is applied; this is why the sensor initialization sections are provided for resetting the corresponding magnetic sensors to their respective initial states.

The three-dimensional magnetic field measurement section 302 is activated by a measuring trigger and measures magnetic field data of the X, Y and Z axes on the basis of input data from the magnetic sensor section 300 and supplies the measured three-dimensional magnetic field data to the measured data storage/determination section 303 and orientation measurement section 309. The three-dimensional magnetic field measurement section 302 starts its measuring operation at timing dictated by the measuring trigger which is given on the basis of execution of an application program or the like requiring orientation measurement.

During calibration, the measured data storage/determination section 303 carries out various operations related to storage of data, such as a determination as to whether or not measured data indicated by digital signals corresponding to outputs from the individual magnetic sensors are to be stored into the measured data storage section 304. The measured data storage section 304 inputs data from the measured data storage/determination section 303 and stores the data therein in accordance with a predetermined storage scheme.

If an offset calculation trigger generation condition is met, the offset calculation trigger section (not shown) gives an offset calculation trigger to the measured data storage section 304 such that the three-dimensional magnetic field data stored in the measured data storage section 304 are output to an subsequent section. The mode determination section 305 determines whether or not the three-dimensional magnetic field data stored in the measured data storage section 304 lie within a same plane in a three-dimensional orientation space. If it has been determined that the three-dimensional magnetic field data stored in the measured data storage section 304 lie within the same plane, then the mode determination section 305 outputs these stored data to the provisional offset calculation section 306, while, if it has been determined that the three-dimensional magnetic field data stored in the measured data storage section 304 do not lie within the same plane, the mode determination section 305 outputs these three-dimensional magnetic field data to the offset calculation section 307.

The provisional offset calculation section 306 estimates provisional offset values from the three-dimensional magnetic field data input from the mode determination section 305 in accordance with a predetermined algorithm, as will be later detailed, and it outputs the estimated offsets to the offset validity determination section 308. The offset calculation section 307 calculates offset values on the basis of the measured data output from the mode determination section 305 and acquired during the calibration, as will be later described, and outputs the calculated offsets to the offset validity determination section 308. Further, the offset validity determination section 308 determines the validity (effectiveness) of the offset values calculated by the offset calculation section 307 or the provisional offset values estimated by the provisional offset calculation section 306, as will also be later described, and outputs, to the orientation measurement section 309, the offset values determined to be valid. The orientation measurement section 309 removes offsets using the offset values determined to be valid by the offset validity determination section 308, and effects the orientation measurement on the basis of the three-dimensional magnetic field data of the X, Y and Z axes output from the three-dimensional magnetic field measurement section 302, as will be later detailed.

Figure 4:
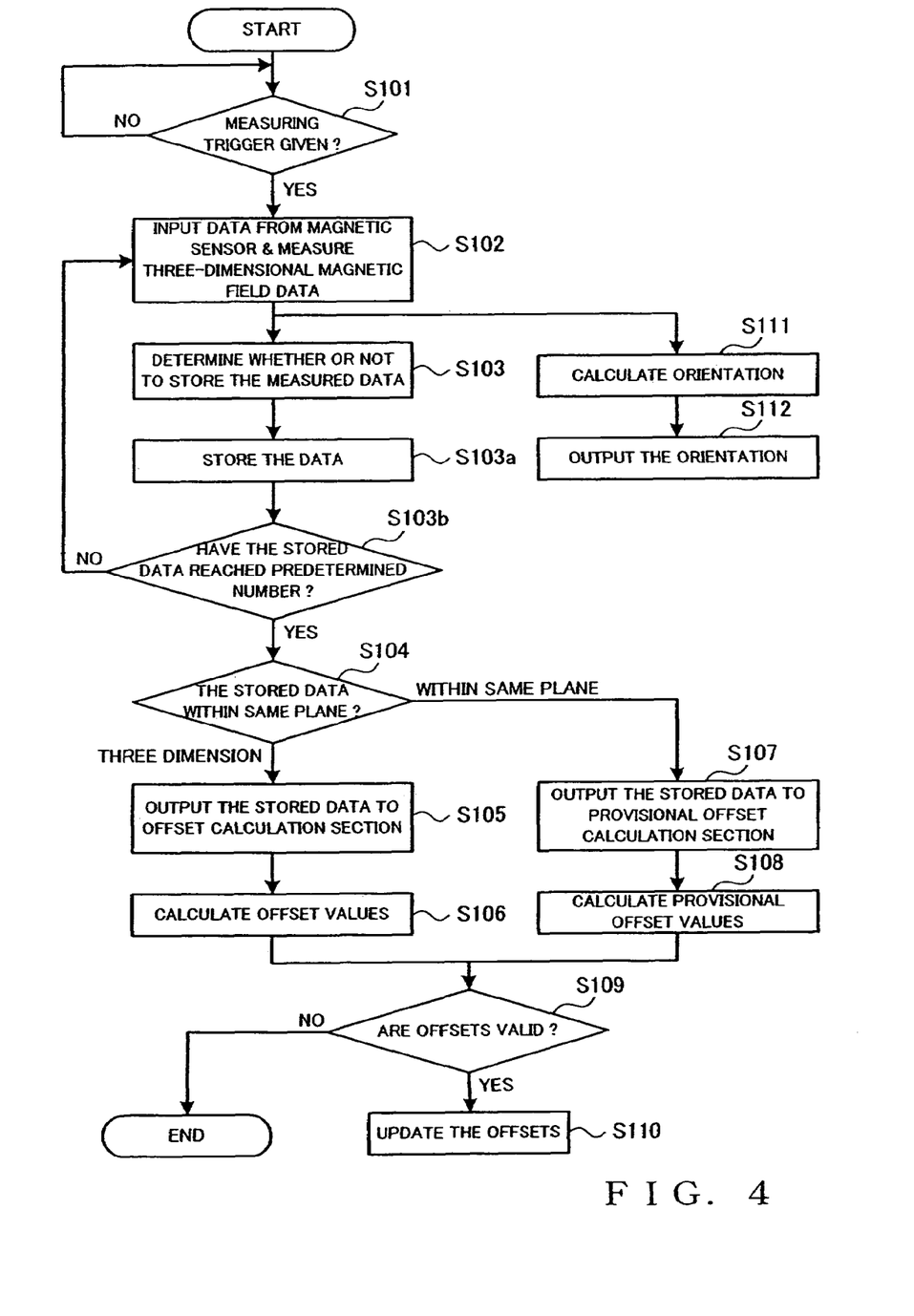
FIG. 4 is a flow chart of orientation output processing performed in the embodiment.

Next, specific operations performed in the instant embodiment will be described, with reference to a flow chart of FIG. 4.

Upon start of an application program requiring orientation measurement (e.g., application program using orientation data, like navigation software or game software), a trigger is activated (i.e., a measuring trigger is given) at each time point when the application program requires orientation data, at step S101. Specifically, such a trigger may be given every predetermined time (i.e., triggering scheme of option 1). Alternatively, outputs from a particular device (e.g., the above-mentioned electronic imaging section 202), separate from the magnetic sensor section 300, provided within the portable terminal 1 may be monitored so that a trigger is given, for example, each time it is estimated, on the basis of the monitored outputs, that there has occurred a change in the orientation of the portable terminal 1 (e.g., each time image data captured by the electronic imaging section 202 have sled (or moved) by a predetermined amount) (i.e., triggering scheme of option 2).

The triggering in accordance with the application program is advantageous in that wasteful electric power consumption can be reduced because the necessary number of measurements can be reduced to the minimum. With the triggering scheme of option 1 above, i.e. the scheme of triggering every predetermined time, data measurements are carried out on a periodical basis, and thus, when the application program has requested orientation measurement, it is only necessary that three-dimensional magnetic field data measured immediately before the orientation measurement request be promptly output. Therefore, the scheme of option 1 permits a quick response. The scheme of option 2 can achieve the above-mentioned two advantages, i.e. reduction of wasteful electric power consumption and quick response, although it presupposes that the other device than the magnetic sensor section 300 is operating within the portable terminal. Therefore, which of the triggering schemes should be chosen may be determined depending, for example, on the features of the apparatus.

Once such a measuring trigger is given, the three-dimensional magnetic field measurement section 302 measures three-dimensional magnetic field data on the basis of data input from the magnetic sensors (i.e., three-axis magnetic sensor unit), and it outputs the three-dimensional magnetic field data to the measured data storage/determination section 303 and orientation measurement section 309, at step S102. In turn, the measured data storage/determination section 303 makes a determination as to whether or not the three-dimensional magnetic field data is to be stored into the measured data storage section 304, at step S103.

Namely, it is determined, with reference to the three-dimensional magnetic field data currently-stored in the measured data storage section 304 and on the basis of a later-described determination scheme, whether the three-dimensional magnetic field data supplied from three-dimensional magnetic field measurement section 302 is to be stored in the storage section 304. If answered in the affirmative at step S103, the tree-dimensional magnetic field data is stored into the measured data storage section 304, at step S103a. Then, at step S103b, a determination is made as to whether the number of the three-dimensional magnetic field data now stored in the storage section 304 has reached a predetermined number. With a NO determination at step S103b, control reverts to step S102 in order to again measure three-dimensional magnetic field data. With a YES determination at step S103b, control proceeds to step S104 to be later described.

Note that, at step S103, any one of various storage-related determination schemes, such as the following, may be chosen.

1) It is determined that all of the three-dimensional magnetic field data are to be stored into the measured data storage section 304.
2) If no three-dimensional magnetic field data is currently stored in the measured data storage section 304, it is determined that the newly-measured three-dimensional magnetic field data is to be stored into the measured data storage section 304. If one or more three-dimensional magnetic field data are currently stored in the measured data storage section 304, then the current measured (i.e., newly-measured) three-dimensional magnetic field data compared with the three-dimensional magnetic field data is compared to the three-dimensional magnetic field data stored in the measured data storage section 304 immediately before the input of the current measured (i.e., newly-measured) three-dimensional magnetic field data (i.e., the three-dimensional magnetic field data last stored in the storage section 304), so that the current measured (i.e., newly-measured) three-dimensional magnetic field data is stored into the measured data storage section 304 only if it satisfies relationship indicated by Mathematical Expression (1) below; note that, in Mathematical Expression (1), (Hx0, Hy0, Hz0) represents the newly-measured three-dimensional magnetic field data while (Hx1, Hy1, Hz1) represents the last measured three-dimensional magnetic field data, and, in this case, d is preferably in the order of 0.05 Oe (oersted).
3) If no three-dimensional magnetic field data is currently stored in the measured data storage section 304, the newly-measured measured three-dimensional magnetic field data is stored into the measured data storage section 304. If, on the other hand, one or more three-dimensional magnetic field data are currently stored in the measured data storage section 304, the newly-measured three-dimensional magnetic field data is stored into the measured data storage section 304 only if each of the currently-stored three-dimensional magnetic field data and the newly-measured three-dimensional magnetic field data satisfy relationship indicated by Mathematical Expression (2) below; note that, in Mathematical Expression (2), (Hx1, Hy0, Hz0) represents the newly-measured three-dimensional magnetic field data while $(Hx^i, Hy^i, Hz^i)$ (i=1, . . . , N) represents each of the measured three-dimensional magnetic field data currently stored in the measured data storage section 304. In this case too, d is preferably in the order of 0.05 Oe.

$$\sqrt{(Hx0-Hx1)^2+(Hy0-Hy1)^2+(Hz0-Hz1)^2} > d \quad (1)$$

$$\sqrt{(Hx0-Hx^i)^2+(Hy0-Hy^i)^2+(Hz0-Hz^i)^2} > d \quad (2)$$

With the above-mentioned item 1) scheme, it is possible to gather a multiplicity of three-dimensional magnetic field data in a shortest period of time, so that the frequency of the calibration process can increase. Thus, this scheme can advantageously correct the offsets within a short time period even when a variation has occurred in the offsets. The above-mentioned item 2) scheme can advantageously avoid the three-dimensional magnetic field data from concentrating in a particular portion of a compass sphere (or orientation sphere). The terms "compass sphere" refer to a sphere depicted by respective trajectories of outputs of the individual axial components of the three-axis magnetic sensor unit, plotted in a predetermined space (this space is also called "three-dimensional orientation space"), as the three-axis magnetic sensor unit is turned in a predetermined earth's magnetism. Further, the above-mentioned item 3) scheme can achieve the most superior uniformity of the three-dimensional magnetic field data, but requires a long time before the three-dimensional magnetic field data are accumulated. Therefore, which of the above-mentioned schemes should be chosen may be determined depending, for example, on the features of the apparatus in light of the above-explained respective characteristics of the schemes.

As described above, if the determination made as the three-dimensional magnetic field data should be stored in the storage section 304, the measured data storage section 304 inputs three-dimensional magnetic field data from the measured data storage/determination section 303, and stores thereinto the input three-dimensional magnetic field data in accordance with any one of storage schemes of the three-dimensional magnetic field data to be described below. The measured data storage section 304, then, inquires of a not-shown offset calculation trigger section about whether or not the stored three-dimensional magnetic field data are to be output to the subsequent section (offset calculation section 307 or provisional offset calculation section 306). If an offset calculation trigger generation condition is met, the offset calculation trigger section gives an offset calculation trigger to the measured data storage section 304 such that the stored three-dimensional magnetic field data are output to the subsequent section (any one of the offset calculation section 307 and provisional offset calculation section 306). If instructed, via the mode determination section 305, to output the stored three-dimensional magnetic field data to the offset calculation section 307, the measured data storage section 304 outputs the stored three-dimensional magnetic field data to the offset calculation section 307. On the other hand, if instructed, via the mode determination section 305, to output the stored three-dimensional magnetic field data to the provisional offset calculation section 306, the measured data storage section 304 outputs the stored three-dimensional magnetic field data to the provisional offset calculation section 306.

Among various possible schemes for storing the three-dimensional magnetic field data are: 1) one in accordance with which three-dimensional magnetic field data are accumulated in the order they have been input, all of the accumulated three-dimensional magnetic field data are deleted once the offset calculation process is terminated in response to the trigger from the offset calculation trigger section, and then accumulation of three-dimensional magnetic field data is started all over again; 2) one in accordance with which three-dimensional magnetic field data are accumulated in the order they have been input and, once a predetermined number of the three-dimensional magnetic field data are accumulated, the oldest one of the accumulated three-dimensional magnetic field data is deleted as new three-dimensional magnetic field data is input, so as to constantly keep the predetermined number of the three-dimensional magnetic field data; 3) one in accordance with which three-dimensional magnetic field data are accumulated in the order they have been input and, once the offset calculation process is terminated in response to the trigger from the offset calculation trigger section, some three-dimensional magnetic field data are deleted from the old or previously-accumulated three-dimensional magnetic field data, so as to secure storage locations for accumulating new three-dimensional magnetic field data; and 4) one in accordance with which three-dimensional magnetic field data are accumulated in the order they have been input and, once a predetermined number of the three-dimensional magnetic field data are accumulated, the newly-measured three-dimensional magnetic field data is stored, replacing one of the stored three-dimensional magnetic field data which corresponds to an orientation closest to that of the newly-measured three-dimensional magnetic field data.

The above-mentioned item 1) storage scheme can advantageously reduce the processing load, and the item 2) storage scheme can readily increase the frequency of the calibration process and thereby correct the offsets within the shortest period of time. Further, the above-mentioned item 3) storage scheme can correct the offsets within a shorter period of time than the item 1) storage scheme, but would increase the calculating load of the calibration process; however, as compared to the item 2) storage scheme, the item 3) storage scheme can lower the frequency of the offset calculation to thereby reduce the calculating load. Further, the above-mentioned item 4) storage scheme can advantageously keep uniform the density of the three-dimensional magnetic field data as compared to the item 2) storage scheme, if the offset variation is small. However, if the offset variation is of a scale greater than the radius of the compass sphere, the item 4) storage scheme would present a possibility of unnecessary three-dimensional magnetic field data remaining stored. Thus, which of the storage schemes should be chosen may be determined in accordance with, for example, the features of the apparatus.

Whereas the above-mentioned offset calculation trigger generation condition corresponds to 1) the determination condition at step S103*b* that the number of the three-dimensional magnetic field data stored in the measured data storage section 304 has reached the predetermined number, it may alternatively be, for example, 2) a condition that the three-dimensional magnetic field data stored in the measured data storage section 304 have reached the predetermined number and a predetermined time has elapsed since the last calibration process, or 3) a condition that a predetermined time has elapsed while the number of the three-dimensional magnetic field data stored in the measured data storage section 304 is four or more.

The above-mentioned item 1) condition is advantageous in that the accuracy based on the number of the three-dimensional magnetic field data can be stabilized and the validity determination, which will be described later, can be made with ease, because the number of the three-dimensional magnetic field data is fixed. The item 2) condition is advantageous in that it allows the calibration process to be performed within a shorter time than the item 1) condition and permits variation in the offsets to be compensated for within a shorter time than the item 1) condition. Further, the item 3) condition is advantageous in that it can avoid a situation where the calibration process is prevented, for a long time, from being initiated. Therefore, which of the above-mentioned conditions should be chosen may be determined depending, for example, on the features of the apparatus in light of the above-explained respective characteristics of the conditions.

Then, at step S104, the mode determination section 305 determines whether the three-dimensional magnetic field data currently stored in the measured data storage section 304 lie within a same plane. If the three-dimensional magnetic field data currently stored in the measured data storage section 304 do not lie within the same plane as determined at step S104, the stored three-dimensional magnetic field data are output to the offset calculation section 307 at step S105, where offsets are calculated on the basis of the three-dimensional magnetic field data at step S106.

The following paragraphs describe an offset calculation algorithm executed at step S106 by the offset calculation section 307 when the three-dimensional magnetic field data currently stored in the measured data storage section 304 do not lie within the same plane as determined at step S104.

If the measured data (i.e., three-dimensional magnetic field data) is represented by $(x_i, y_i, z_i)$ (i=1, ..., N), the offsets are represented by (X0, Y0, Z0) and the radius of the compass sphere is represented by R, then the following relationship is established:

$$(x_i-X0)^2+(y_i-Y0)^2+(z_i-Z0)^2=R^2$$

Here, a minimum mean square error $\epsilon$ is defined as follows:

$$\varepsilon = \sum \{(x_i - X0)^2 + (y_i - Y0)^2 + (z_1 - Z0)^2 - R^2\}^2 \quad (3)$$
$$= \sum \{(x_i^2 + y_i^2 + z_i^2) - 2x_iX0 - 2y_iY0 - 2z_iZ0 + (X0^2 + Y0^2 + Z0^2) - R^2\}^2$$

If $$a_i = x_i^2 + y_i^2 + z_i^2$$
$$b_i = -2x_i$$
$$c_i = -2y_i$$
$$d_i = -2z_i$$
$$D = (X0^2+Y0^2+Z0^2)-R^2 \qquad \text{Equations (A),}$$

then the minimum mean square error $\epsilon$ can be expressed by $$\epsilon = \Sigma(a_i + b_i X0 + d_i Z0 + D)^2 \quad (4)$$

Here, a condition for minimizing the minimum mean square error $\epsilon$ is expressed as follows by differentiating $\epsilon$ with X0, Y0, Z0 and D. To simplify the calculation, X0, Y0, Z0 and D are considered as independent variables of $\epsilon$.

$$\begin{cases} \dfrac{\partial \varepsilon}{\partial X0} = 2\sum (a_i + b_i X0 + c_i Y0 + d_i Z0 + D) b_i = 0 \\ \dfrac{\partial \varepsilon}{\partial Y0} = 2\sum (a_i + b_i X0 + c_i Y0 + d_i Z0 + D) c_i = 0 \\ \dfrac{\partial \varepsilon}{\partial Z0} = 2\sum (a_i + b_i X0 + c_i Y0 + d_i Z0 + D) d_i = 0 \\ \dfrac{\partial \varepsilon}{\partial D} = 2\sum (a_i + b_i X0 + c_i Y0 + d_i Z0 + D) = 0 \end{cases} \quad (5)$$

Thus, the following mathematical expression can be established;

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix} \quad (6)$$

However, $$[m] = \sum_{i=1}^{N} m_i \quad [mn] = \sum_{i=1}^{N} m_i n_i \quad (7)$$

Solving this simultaneous equation can determine X0, Y0, Z0 and D which are offset values that minimize the minimum mean square error $\epsilon$. With Equations (A) above, R, i.e. the radius of the compass sphere, can also be determined.

If, on the other hand, the three-dimensional magnetic field data currently stored in the measured data storage section 304 lie within the same plane as determined at step S104, the stored three-dimensional magnetic field data are output to the provisional offset calculation section 306 at step S107, where provisional offsets are calculated on the basis of the three-dimensional magnetic field data at step S108.

In this case, the determination as to whether or not the three-dimensional magnetic field data lie within the same plane is made by performing a fitting operation on the assumption that the three-dimensional magnetic field data lie within the same plane. If measured data points (three-dimensional magnetic field data) are given as "$(x_i, y_i, z_i)$" (i=1, ..., N) and the above-mentioned plane is given as "by+cz+1=0", b and c can be determined by a least square method using Mathematical Expression (8) below, where $\epsilon 0$ represents a minimum mean square error.

$$\varepsilon 0 = \sum_{i=1}^{N}(by_i + cz_i + 1)^2 \quad (8)$$

$$\begin{cases} \dfrac{\partial \varepsilon 0}{\partial b} = \sum_{i=1}^{N} 2y_i(by_i + cz_i + 1) = 0 \\ \dfrac{\partial \varepsilon 0}{\partial c} = \sum_{i=1}^{N} 2z_i(by_i + cz_i + 1) = 0 \end{cases}$$

$$\begin{bmatrix} [yy] & [yz] \\ [yz] & [zz] \end{bmatrix} \begin{bmatrix} b \\ c \end{bmatrix} = \begin{bmatrix} -[y] \\ -[z] \end{bmatrix}, \text{where}$$

$$[] = \sum_{i=1}^{N} $$

Then, b and c is determined by solving this simultaneous equation, and Mathematical Expression (9) is calculated using the thus-determined b and c.

$$\varepsilon 1 = \sqrt{\dfrac{1}{N}\sum_{i=1}^{N}(by_i + cz_i + 1)^2} \quad (9)$$

If $\epsilon 1$ is below 10% of the geomagnetic intensity, it is determined that the measured data points are within substantially the same plane. Also assume here that the plane where the data points lie is given as "by+cz+1=0".

Offsets when the three-dimensional magnetic field data lie within the same plane are calculated in accordance with a provisional offset calculation algorithm explained below. The provisional offset calculation algorithm is executed at step S108 by the provisional offset calculation section 306.

Namely, when the three-dimensional magnetic field data lie within the same plane, "by+cz+1=0", these three-dimensional magnetic field data lie on a certain circular arc. Thus, in the provisional offset calculation operation at step S108, the center coordinates (X0, Y0, Z0), which represent provisional offsets, and the radius R of the circular arc are determined by Mathematical Expression (10), Mathematical Expression (11) and Mathematical Expression (12) below.

$$(x_i - XO)^2 + (y_i - YO)^2 + (z_i - ZO)^2 = R^2 \quad (10)$$

$$ZO = -\frac{1}{c}(1 + bYO) \cdots (1)$$

$$\therefore (x_i - XO)^2 + (y_i - YO)^2 + \left\{z_i + \frac{1}{c}(1 + bYO)\right\}^2 = R^2$$

$$\varepsilon 2 = \left[\sum_{i=1}^{M} [(x_i - XO)^2 + (y_i - YO)^2 + \left\{z_i + \frac{1}{c}(1 + bYO)\right\}^2 - R^2\right]^2 \quad (11)$$

$$= \sum_{i=1}^{N} \left[x_i^2 + y_i^2 + z_i^2 + \frac{2z_i}{c} + \frac{1}{c^2} - 2x_i XO + 2\left(\frac{b}{c}z_i + \frac{b}{c^2} - y_i\right)YO - R^2 + XO^2 + \left(1 + \frac{b^2}{c^2}\right)YO^2\right]^2$$

$$f = x_i^2 + y_i^2 + z_i^2 + \frac{2z_i}{c} + \frac{1}{c^2}$$

$$g = -2x_i$$

$$h = 2\left(\frac{b}{c}z_i + \frac{b}{c^2} - y_i\right)$$

$$K = -R^2 + XO^2 + \left(1 + \frac{b^2}{c^2}\right)YO^2$$

$$\varepsilon 2 = \sum_{i=1}^{N} [f + gXO + hYO + K]^2 \quad (12)$$

$$\therefore \begin{cases} \frac{\partial \varepsilon 2}{\partial XO} = 2\sum_{i=1}^{N} [f + gXO + hYO + K]g = 0 \\ \frac{\partial \varepsilon 2}{\partial YO} = 2\sum_{i=1}^{N} [f + gXO + hYO + K]h = 0 \\ \frac{\partial \varepsilon 2}{\partial K} = 2\sum_{i=1}^{N} [f + gXO + hYO + K] = 0 \end{cases}$$

$$\therefore \begin{bmatrix} [gg] & [gh] & [g] \\ [gh] & [hh] & [h] \\ [g] & [h] & N \end{bmatrix} \begin{bmatrix} XO \\ YO \\ K \end{bmatrix} = \begin{bmatrix} -[fg] \\ -[fh] \\ -[f] \end{bmatrix}$$

The offset values determined at step S106 and the provisional offset values determined at step S108 are output to the offset validity determination section, where the validity of the offset values and provisional offset values is judged through respective different judgment schemes (step S109).

Namely, for the offset values determined at step S106, the following values are calculated on the basis of the calculated offsets, the radius of the compass sphere and the three-dimensional magnetic field data stored in the measured data storage section 304.

$$\sigma = \frac{1}{R}\sqrt{\frac{N\sum_{i=1}^{N}\{(x_i - XO)^2 + (y_i - YO)^2 + (z_i - ZO)^2\} - \left(\sum_{i=1}^{N}\sqrt{(x_i - XO)^2 + (y_i - YO)^2 + (z_i - ZO)^2}\right)^2}{N^2}} \quad (13)$$

$$w_x = \frac{\text{Max}(x_i) - \text{Min}(x_i)}{R} \quad (14)$$

$$w_y = \frac{\text{Max}(y_i) - \text{Min}(y_i)}{R} \quad (15)$$

$$w_x = \frac{\text{Max}(z_i) - \text{Min}(z_i)}{R} \quad (16)$$

Max($x_i$) and Min($x_i$) represent maximum and minimum values, respectively, of the measures data (i.e., three-dimensional magnetic field data) $x_1, \ldots, x_N$, and $\sigma$ represents a standard deviation. Then, for the above-mentioned values, it is determined whether or not the following judging criteria are met. If the judging criteria have been met, then the estimated offsets are determined to be valid:

$\sigma < F$
$w_x < G$
$w_y > G$
$w_z > G$, where F is preferably about 0.1 and G is preferably about 1.

Then, the validity of the provisional offset values determined at step S108 is judged, using, for example, the following two schemes.

1) The first scheme where the validity of the provisional offset values is judged to be valid if the diameter of the circular arc obtained in determining the offset values is greater than a predetermined value.
2) The second scheme where the validity of the provisional offset values is judged to be valid if the standard deviation a determined by Mathematical Expression (17) below (where the radius of the circular arc obtained in determining the offset values is given as R and the currently-stored data are given as $Hx^i$, $Hy^i$, $Hz^i$) is smaller than a predetermined value.

When the validity of the provisional offset values has been judged to be valid by both of the item 1) and 2) schemes, then the provisional offset values determined at step S108 are determined to be valid. Alternatively, the provisional offset values determined at step S108 may be determined to be valid when the validity of the provisional offset values has been judged to be valid by only either one of the item 1) and 2) schemes.

$$\sigma = \frac{1}{R^2 N}\sum_{i=1}^{N}\left[\sqrt{\frac{(Hx^i - XO)^2 + (Hy^i - YO)^2 + (Hz^i - ZO)^2}{}} - R\right]^2 \quad (17)$$

When the offsets have been determined valid in the above-described manner, the offset values stored in a storage device (not shown) within the orientation measurement section 309 are updated at step S110.

If the offset values stored in the storage device (not shown) within the orientation measurement section 309 are not provisional offsets, the orientation measurement section 309 removes the offsets from the measured data (three-dimensional magnetic field data) input from the three-dimensional magnetic field measurement section 302 (namely, corrects the input three-dimensional magnetic field data with the offset values), and then it calculates an orientation using any one of the following schemes at step S111.

1) If the portable terminal is assumed to be in a horizontal posture, the orientation is calculated on the basis of Mathematical Expression (18) below.
2) If the portable terminal is assumed to be inclined at an inclination angle a (radian) with respect to the horizontal plane, the orientation is calculated on the basis of Mathematical Expression (19) below. The inclination angle a may be detected by providing an inclination sensor in the portable terminal 1 and then used in Mathematical Expression (19) below, or an appropriate value of the inclination angle a, assumable when the user is holding the portable terminal 1, may be preset and then used in Mathematical Expression (19) below.

Here, Hx, Hy, Hz are outputs from the magnetic sensor, the orientation indicates an orientation of the Y axis of the magnetic sensor, and it is assumed that the magnetic north is zero degree.

$$\text{Abs}(Hx) < \text{Abs}(Hy) \text{ AND } Hy > 0 \quad (18)$$

Then direction $(deg) = -\arctan(Hx/Hy) * 180/\pi$ $\text{Abs}(Hx) < \text{Abs}(Hy) \text{ AND } Hy < 0$ Then direction $(deg) = 180 - \arctan(Hx/Hy) * 180/\pi$ $\text{Abs}(Hx) > \text{Abs}(Hy) \text{ AND } Hx > 0$ Then direction $(deg) = 90 + \arctan(Hx/Hy) * 180/\pi$ $\text{Abs}(Hx) > \text{Abs}(Hy) \text{ AND } Hx < 0$ Then direction $(deg) = 270 + \arctan(Hx/Hy) * 180/\pi$ $$\text{Abs}(Hx) < \text{Abs}(Hy') \text{ AND } Hy > 0 \quad (19)$$

Then direction $(deg) = -\arctan(Hx/Hy') * 180/\pi$ $\text{Abs}(Hx) < \text{Abs}(Hy') \text{ AND } Hy < 0$ Then direction $(deg) = 180 - \arctan(Hx/Hy') * 180/\pi$ $\text{Abs}(Hx) > \text{Abs}(Hy') \text{ AND } Hx > 0$ Then direction $(deg) = 90 + \arctan(Hx/Hy') * 180/\pi$ $\text{Abs}(Hx) > \text{Abs}(Hy') \text{ AND } Hx < 0$ Then direction $(deg) = 270 + \arctan(Hx/Hy') * 180/\pi$, where $Hy' = Hy\cos(a) - Hz'\sin(a)$ The item 1) scheme can calculate an orientation with a satisfactory accuracy because it is relatively easy for the user to hold the portable terminal in the horizontal posture. The item 2) scheme can calculate a generally accurate orientation because the user normally hold the portable terminal in a posture inclined with respect to the horizontal plane, although a very high accuracy can not be expected in this case since it is difficult to always keep the portable terminal at a fixed angle.

If the offset values stored in the storage device within the orientation measurement section 309 are provisional offsets, the orientation measurement section 309 removes, after calculation of the provisional offsets, the offsets (provisional offset values) from the measured data (three-dimensional magnetic field data) input from the three-dimensional magnetic field measurement section 302 (namely, corrects the three-dimensional magnetic field data with the provisional offset values), and then it calculates an orientation using the following scheme at step S111. Namely, Hx1 and Hy1 are determined by calculating Mathematical Expression (20) below with the data obtained via the magnetic sensor given as (Sx, Sy, Sz) and the provisional offsets given as (X0, Y0, Z0). By substituting Hx1 and Hy1 for Hx and Hy, respectively, in Mathematical Expression (18), an orientation can be calculated. The thus-obtained orientation is displayed on a not-shown display and/or the like of the portable terminal at step S112.

$$Hx1 = Sx - X0 \quad Hy1 = \sqrt{(Sy-Y0)^2 + (Sz-Z0)^2} \quad (20)$$

Thus, even when three-dimensional magnetic field data obtained via the three-axis magnetic sensor unit are limited within a particular plane, the above-described embodiments of the present invention can perform appropriate calibration to measure a correct orientation. For example, with the above-described embodiments, appropriate calibration is permitted in response to mere operation performable by the user with utmost ease while the user is looking at a map, such as user's operation of changing the orientation of the portable terminal while looking at a display screen of the portable terminal. Thus, the above-described embodiments of the invention can constantly provide correct orientation information.

Whereas the embodiments of the present invention have been described with the accompanying drawings, the specific arrangements of the present invention are, of course, not limited to those of the described embodiments and may be modified variously without departing from the gist or basic principles of the invention. For example, although the embodiments have been described above in relation to the case where arithmetic operations are performed on orientation data by the main control section of the portable terminal, the present invention is not so limited; for example, the present invention may be constructed as an orientation sensor unit having a magnetic sensor chip and a function for performing arithmetic operations on orientation data.

What is claimed is:

1. An orientation data generation method comprising:
    a measurement step of inputting data outputted from a geomagnetic sensor that detects magnetic fields in three axial directions and then measuring magnetic field data on the basis of the inputted data;
    a storage step of sequentially storing the magnetic field data measured by said measurement step;
    a determination step of determining whether or not a plurality of the magnetic field data stored by said storage step lie within a same plane in a three-dimensional orientation space;
    a provisional offset calculation step of, when said determination step has determined that the plurality of the magnetic field data, stored by said storage step, lie within the same plane in the three-dimensional orientation space, calculating, as provisional offset values, center coordinates of a circular arc where the stored magnetic field data lie, on the basis of the magnetic field data and in accordance with a predetermined algorithm; and
    an arithmetic operation step of correcting, with the provisional offset values, magnetic field data measured after calculation, by said provisional offset calculation step, of the provisional offset values and performing an arithmetic operation for determining orientation data on the basis of the corrected magnetic field data.

2. An orientation data generation method as claimed in claim 1 wherein said provisional offset calculation step also calculates a radius of the circular arc.

3. An orientation data generation method as claimed in claim 2 wherein said provisional offset calculation step calculates a standard deviation of the magnetic field data, using the plurality of the magnetic field data stored by said storage step, the center coordinates of the circular arc calculated in accordance with the predetermined algorithm and the radius of the circular arc, and determines, on the basis of the calculated standard deviation, whether or not the center coordinates of the circular arc calculated in accordance with the predetermined algorithm are valid as the provisional offset values, wherein, when said determination step has determined that the center coordinates are valid as the provisional offset values, said provisional offset calculation step determines the calculated center coordinates of the circular arc as the provisional offset values, and wherein said arithmetic operation step corrects the magnetic field data using the provisional offset values determined by said provisional offset calculation step.

4. An orientation data generation method as claimed in claim 3 wherein the standard deviation is determined by $$\sigma = \frac{1}{R^2 N} \sum_{i=1}^{N} \left[ \sqrt{(Hx^i - X0)^2 + (Hy^i - Y0)^2 + (Hz^i - Z0)^2} - R \right]^2,$$

where $Hx^i$, $Hy^i$ and $Hz^i$ represent components, in the three axial directions, of each of the stored magnetic field data, X0, Y0 and Z0 represent the center coordinates of the circular arc, R represents the radius of the circular arc, and N represents a number of the stored magnetic field data.

5. An orientation data generation method as claimed in claim 1 which further comprises an offset calculation step of, when said determination step has determined that the plurality of the magnetic field data stored by said storage step do not lie within the same plane in the three-dimensional orientation space, calculating offset values on the basis of the plurality of the stored magnetic field data and in accordance with an algorithm different from the predetermined algorithm, and wherein said arithmetic operation step corrects, with the offset values calculated by said offset calculation step, magnetic field data measured after calculation, by said offset calculation step, of the offset values and then calculating orientation data on the basis of the corrected magnetic field data.

6. An orientation data generation method as claimed in claim 1 wherein said measurement step measures a plurality of the magnetic field data during a time period that said geomagnetic sensor is moved to change an orientation thereof with respect to earth's magnetism, and said storage step stores the plurality of the magnetic field data measured by said measurement step.

7. An orientation data generation method as claimed in claim 6 wherein said measurement step measures a plurality of the magnetic field data based on output data, pertaining to different orientations, from said geomagnetic sensor during a time period that said geomagnetic sensor is turned within a plane parallel to an earth's surface in a posture inclined within a predetermined angle range with respect to the earth's surface.

8. An orientation sensor unit comprising:
a geomagnetic sensor that detects magnetic fields in three axial directions;
a magnetic field data measurement section that inputs data outputted from said geomagnetic sensor and measures magnetic field data on the basis of the inputted data;
a storage section that sequentially stores the magnetic field data measured by said magnetic field data measurement section;
a determination section that determines whether or not a plurality of the magnetic field data stored in said storage section lie within a same plane in a three-dimensional orientation space;
a provisional offset calculation section that, when said determination section has determined that the plurality of the magnetic field data, stored in said storage section, lie within the same plane in the three-dimensional orientation space, calculates, as provisional offset values, center coordinates of a circular arc where the plurality of the stored magnetic field data lie, on the basis of the magnetic field data and in accordance with a predetermined algorithm; and
an arithmetic operation section that corrects, with the provisional offset values, magnetic field data measured after calculation, by said provisional offset calculation section, of the provisional offset values and performs an arithmetic operation for determining orientation data on the basis of the corrected magnetic field data.

9. An orientation sensor unit as claimed in claim 8 wherein said provisional offset calculation section also calculates a radius of the circular arc.

10. An orientation sensor unit as claimed in claim 9 wherein said provisional offset calculation section calculates a standard deviation of the magnetic field data, using the plurality of the magnetic field data stored in said storage section, the center coordinates of the circular arc calculated in accordance with the predetermined algorithm and the radius of the circular arc, and determines, on the basis of the calculated standard deviation, whether or not the center coordinates of the circular arc calculated in accordance with the predetermined algorithm are valid as the provisional offset values, wherein, when said determination section has determined that the center coordinates are valid as the provisional offset values, said provisional offset calculation section determines the calculated center coordinates of the circular arc as the provisional offset values, and wherein said arithmetic operation section corrects the magnetic field data using the provisional offset values determined by said provisional offset calculation section.

11. An orientation sensor unit as claimed in claim 10 wherein the standard deviation is determined by $$\sigma = \frac{1}{R^2 N} \sum_{i=1}^{N} \left[ \sqrt{(Hx^i - X0)^2 + (Hy^i - Y0)^2 + (Hz^i - Z0)^2} - R \right]^2,$$

where $Hx^i$, $Hy^i$ and $Hz^i$ represent components, in the three axial directions, of each of the stored magnetic field data, X0, Y0 and Z0 represent the center coordinates of the circular arc, R represents the radius of the circular arc, and N represents a number of the stored magnetic field data.

12. An orientation sensor unit as claimed in claim 8 which further comprises an offset value calculation section that, when said determination section has determined that the plurality of the magnetic field data stored in said storage section do not lie within the same plane in the three-dimensional orientation space, calculates offset values on the basis of the plurality of the stored magnetic field data and in accordance with an algorithm different from the predetermined algorithm, and wherein said arithmetic operation section corrects, with the offset values calculated by said offset value calculation section, magnetic field data measured after calculation, by said offset value calculation section, of the offset values and calculates orientation data on the basis of the corrected magnetic field data.

13. Portable electronic equipment comprising the orientation sensor unit as recited in claim 8.

14. Portable electronic equipment as claimed in claim 13 wherein said magnetic field data measurement section measures magnetic field data based on data inputted from said geomagnetic sensor, in response to an orientation data request generated within said portable electronic equipment.

15. A storage medium readable by a computer and containing a group of instructions for causing the computer to perform orientation data calculation processing on the basis of data outputted from a geomagnetic sensor that detects magnetic fields in three axial directions, said orientation data calculation processing comprising:

a measurement step of inputting data outputted from said geomagnetic sensor and then measuring magnetic field data on the basis of the inputted data;

a storage step of sequentially storing the magnetic field data measured by said measurement step;

a determination step of determining whether or not a plurality of the magnetic field data stored by said storage step lie within a same plane in a three-dimensional orientation space;

a provisional offset calculation step of, when said determination step has determined that the plurality of the magnetic field data, stored by said storage step, lie within the same plane in the three-dimensional orientation space, calculating, as provisional offset values, center coordinates of a circular arc where the stored magnetic field data lie, on the basis of the magnetic field data and in accordance with a predetermined algorithm; and an arithmetic operation step of correcting, with the provisional offset values, magnetic field data measured after calculation, by said provisional offset calculation step, of the provisional offset values and performing an arithmetic operation for determining orientation data on the basis of the corrected magnetic field data.

16. A storage medium as claimed in claim 15 wherein said provisional offset calculation step also calculates a radius of the circular arc.

17. A storage medium as claimed in claim 16 wherein said provisional offset calculation step calculates a standard deviation of the magnetic field data, using the plurality of the magnetic field data stored by said storage step, the center coordinates of the circular arc calculated in accordance with the predetermined algorithm and the radius of the circular arc, and determines, on the basis of the calculated standard deviation, whether or not the center coordinates of the circular arc calculated in accordance with the predetermined algorithm are valid as the provisional offset values, wherein, when said determination step has determined that the center coordinates are valid as the provisional offset values, said provisional offset calculation step determines the calculated center coordinates of the circular arc as the provisional offset values, and wherein said arithmetic operation step corrects the magnetic field data using the provisional offset values determined by said provisional offset determination step.

18. A storage medium as claimed in claim 17 wherein the standard deviation is determined by $$\sigma = \frac{1}{R^2 N} \sum_{i=1}^{N} \left[ \sqrt{(Hx^i - X0)^2 + (Hy^i - Y0)^2 + (Hz^i - Z0)^2} - R \right]^2,$$

where $Hx^i$, $Hy^i$ and $Hz^i$ represent components, in the three axial directions, of each of the stored magnetic field data, X0, Y0 and Z0 represent the center coordinates of the circular arc, R represents the radius of the circular arc, and N represents a number of the stored magnetic field data.

19. A storage medium as claimed in claim 15 wherein said orientation data calculation processing further comprises an offset calculation step of, when said determination step has determined that the plurality of the magnetic field data stored by said storage step do not lie within the same plane in the three-dimensional orientation space, calculating offset values on the basis of the plurality of the stored magnetic field data and in accordance with an algorithm different from the predetermined algorithm, and wherein said arithmetic operation step corrects, with the offset values calculated by said offset calculation step, magnetic field data measured after calculation, by said offset calculation step, of the offset values and calculating orientation data on the basis of the corrected magnetic field data.

* * * * *